United States Patent [19]

Kobayashi

[11] Patent Number: 5,669,761

[45] Date of Patent: Sep. 23, 1997

[54] DISCHARGE CONTROL APPARATUS OF HYDRAULIC PUMP FOR AUTOMATIC TRANSMISSION

[75] Inventor: Toshio Kobayashi, Tokyo, Japan

[73] Assignee: Fuji Jukogyo Kabushiki Kaisha, Tokyo, Japan

[21] Appl. No.: 555,582

[22] Filed: Nov. 8, 1995

[30] Foreign Application Priority Data

Nov. 15, 1994 [JP] Japan .................. 6-280604

[51] Int. Cl.⁶ .......................... F04B 49/08
[52] U.S. Cl. .............. 417/302; 477/157; 417/308
[58] Field of Search ................ 417/302, 308; 418/171; 477/157

[56] References Cited

U.S. PATENT DOCUMENTS

| | | | |
|---|---|---|---|
| 3,078,736 | 2/1963 | Meads et al. | 477/157 X |
| 4,391,569 | 7/1983 | Bristow | 417/302 |
| 4,597,718 | 7/1986 | Nakano et al. | 417/308 X |
| 4,598,612 | 7/1986 | Ideta | 477/157 X |
| 4,767,296 | 8/1988 | Satomoto et al. | 418/171 |
| 5,005,443 | 4/1991 | Sugano | 477/157 X |
| 5,226,802 | 7/1993 | Nakamura et al. | 417/302 X |

FOREIGN PATENT DOCUMENTS

| | | |
|---|---|---|
| 58-204986 | 11/1983 | Japan . |
| 63-69791 | 5/1988 | Japan . |

*Primary Examiner*—Richard E. Gluck
*Attorney, Agent, or Firm*—Martin A. Farber

[57] ABSTRACT

In an automatic transmission, the amount of transmission fluid discharged is controlled by a flow control valve. A fixed displacement type pump is connected with a bypass passage through which a part of fluid discharged from a discharge port of the pump flows back to a suction port of the pump. A flow control valve is provided in the bypass passage so as to regulate the amount of discharged fluid at an approximate equal level according to a feedback pressure generated in a pressure regulating valve.

4 Claims, 5 Drawing Sheets

DISCHARGE CONTROL APPARATUS OF HYDRAULIC PUMP FOR AUTOMATIC TRANSMISSION

BACKGROUND OF THE INVENTION

1. Field of the Invention

The present invention relates to an apparatus for controlling an amount of working oil discharged by a hydraulic pump for delivering hydraulic pressure to hydraulic control apparatuses in a vehicular automatic transmission.

2. Prior Arts

The vehicular automatic transmission is equipped with a hydraulic pump driven by a vehicular engine for delivering working oil. The working oil is guided to pressure regulating valves in the hydraulic control apparatus for producing line pressure, working pressure and lubrication pressure respectively. These pressures are fed to a torque converter, control valves, clutches, brakes and lubricated portions to carry out miscellaneous functions for shifting gears. Therefore, since the hydraulic pump is driven directly by the engine and the pump discharge is dependant on the engine revolution, it is desirable from the aspect of fuel consumption that the unnecessary amount of discharged oil is not supplied, especially when the engine revolution is high.

With respect to the discharge control apparatus for the hydraulic pump, for example, Japanese Unexamined Patent Application Toku-Kai-Sho No. 58-204986 discloses a variable displacement type hydraulic pump. Further, Japanese Unexamined Utility Model Application Jitsu-Kai-Sho No. 63-69791 discloses a combined technique of a fixed displacement type hydraulic pump and a flow control valve.

The variable displacement type hydraulic pump according to the first prior art comprises a vane pump and an eccentric control mechanism. That is, in a housing thereof a plurality of vanes are provided on a rotor rotated by the engine and a cam ring is eccentrically provided around the rotor. Further, in the rotor a vane ring and the cam ring are eccentrically provided and the vanes are disposed between the cam ring and the vane ring. The cam ring is biased by a return spring and a control piston is connected against the return spring. A hydraulic pressure chamber is provided behind the control piston so as to introduce a feedback pressure thereto through a pressure regulating valve.

When the rotor is rotated by the engine, the vanes suck working oil from a suction port and discharge compressed working oil out of a discharge port. At this moment, when the control piston goes back due to the low feedback pressure, the eccentricity of the cam ring becomes largest and as a result the discharge amount increases. Further, when the discharge amount of the pump increases due the increase of the engine revolution, the feedback pressure rises due to the increased line pressure by the operation of the pressure regulating valve. Because of this, the cam ring is pushed by the control piston and the eccentricity thereof is gradually reduced. Thus, the discharge amount of the pump is reduced and is controlled so as to be constant when the revolution of the pump get a specified value and more.

In the combination of the fixed displacement pump and the flow control valve according to the second prior art, the flow control valve is disposed downstream of the discharge port of the internal gear meshing type pump so as to open or close a bypass port by means of moving a spool by the pressure difference between the upstream and downstream portions of an orifice. Further, when the discharge amount of the pump increases according to the engine revolution, the spool moves so as to open the bypass port and to bypass a part of oil to the suction side and thus the discharge amount is kept constant.

However, in the first prior art, since the cam ring and the eccentric control mechanism of the control piston are large in configuration, the cost of the apparatus is expensive and a large accommodation space is needed. Be cause of this, there is a small degree of freedom in the constitution of the pump mechanism and the hydraulic circuits for an automatic transmission. Particularly, in a longitudinally mounted transaxle type automatic transmission in which a drive pinion of a front differential is borne by a wall section where the hydraulic pump is provided, the disposition of the hydraulic circuits and the pinion bearing must be satisfied at the same time. Consequently, the limitation in space utility gets worse. Further, in this type of the automatic transmission, a large thrust force is applied to the wall section because of the meshing of the hypoid gear of the front differential with the drive pinion. To avoid the damage or the abrasion of the pump due to the deformation of the wall section caused by this large large thrust force, it is necessary to secure an enough rigidity by way of using steel material for the whole housing of the automatic transmission including the wall section. This incurs an upsizing of the automatic transmission and an increase of the weight thereof.

Further, since the cam ring is slidably connected with the control piston, a large friction force is produced in particular portions. Further, since the control piston has three seal rings, the piston is inhibited to move smoothly. Further, when the piston is operated under the high temperature condition for a long time, the sealing ability is reduced to incur a low discharge efficiency of the pump.

With respect to the second prior art, since the flow control valve is operated by the oil itself discharged from the pump, the precision of the flow control valve influences the discharge performance of the pump directly. Further, there is a restriction in arranging the valve on the pump body. Further, since the flow control valve is operated by the pressure difference across an orifice, it is necessary to establish a proper size of the diameter of the orifice. In this case, since the pressure difference varys according to the viscosity whose value is changed by oil temperature, it is difficult to determine unconditionally.

SUMMARY OF THE INVENTION

Accordingly, the present invention is intended to obviate the above-described problems and disadvantages of the known apparatus and it is summarized as follows.

BRIEF DESCRIPTION OF THE DRAWINGS

A specific embodiment of the present invention will be described with reference to the accompanying drawings, in which.

DETAILED DESCRIPTION OF PREFERRED EMBODIMENTS

Figure 6:
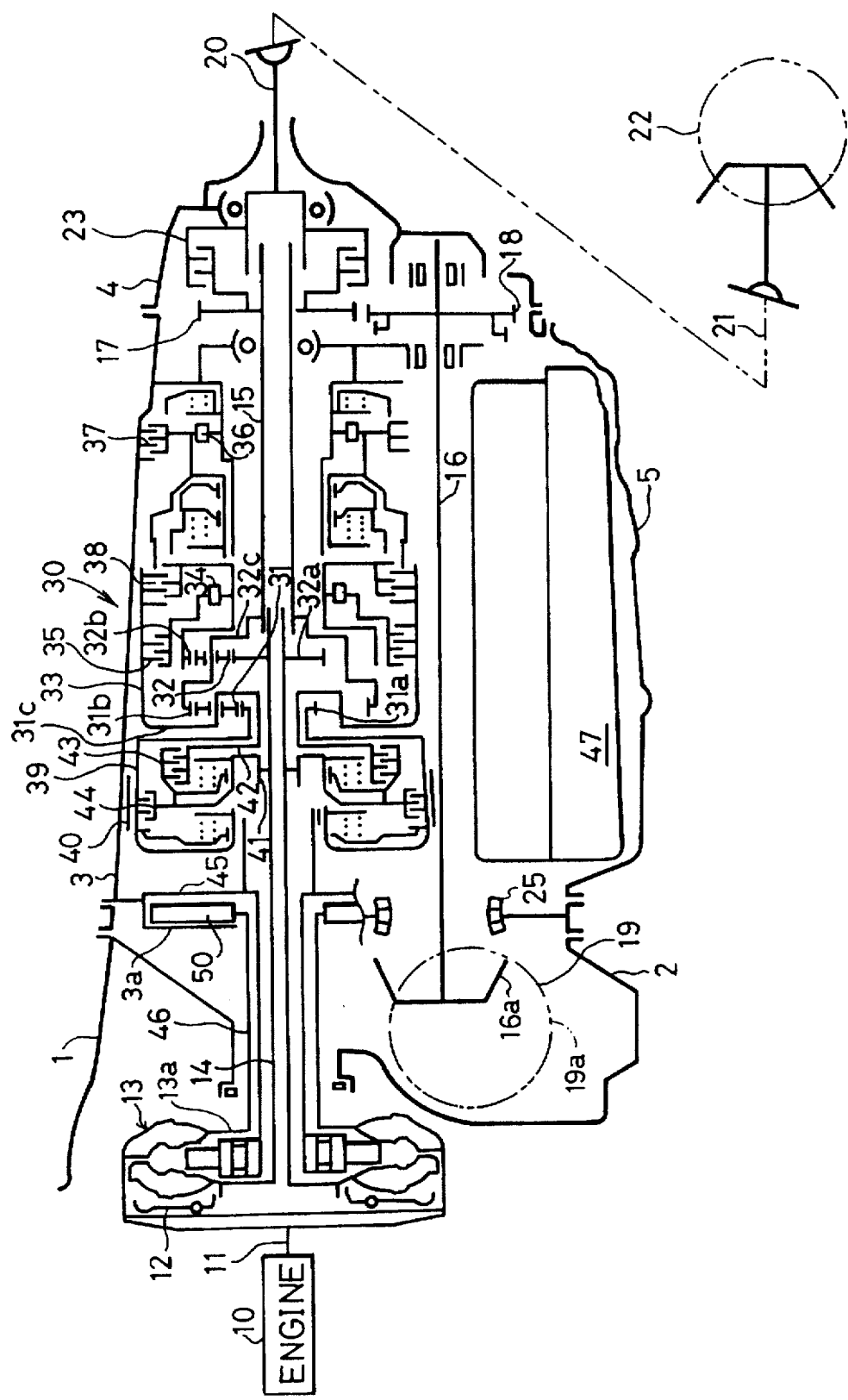
FIG. 6 is a schematic diagram of an automatic transmission according to the present invention.

An embodiment according to the present invention will be described in detail with reference to the accompanying drawings. Referring now to FIG. 6, an example of an automatic transmission to which the present invention is applied will be described.

The automatic transmission comprises a torque converter case 1, a differential case 2, a transmission case 3, an extension case 4 and an oil pan 5.

Numeral 10 denotes an engine whose crank shaft 11 is connected with a torque converter 13 equipped with a lockup clutch 12. An input shaft 14 from the torque converter 13 is inputted to an automatic gearing mechanism 30 in the transmission case 3. Further, an output shaft 15 is outputted coaxially with the input shaft 14 from the rear end of the automatic gearing mechanism 30.

A front drive shaft 16 is provided in parallel with the input and output shafts 14, 15 in the transmission case 3 and is connected with the output shaft 15 through a pair of reduction gears 17, 18. The front end of the front drive shaft 16 is connected with a front wheel axle through a front differential apparatus 19 contained in a differential case 2 so as to transfer a front drive torque continuously to the front axle.

On the other hand, the reduction gear 17 integrally coupled with the output shaft 15 is connected with a rear drive shaft 20 bore by an extension case 4 through a transfer clutch 23 of a so-called hydraulic multi-disc type. A rear drive torque is transferred from the rear drive shaft 20 to a rear wheel axle through a propeller shaft 21 and a rear differential apparatus 22. The clutch torque of the transfer clutch 23 is controlled according to miscellaneous operating conditions, or road conditions such as starting on a road surface with a low friction coefficient, turning corners, braking and the like and according to this clutch torque the power is transmitted to the rear wheel, whereby a fourwheel is available.

In this example, the automatic gearing mechanism 30 comprises a first planetary gear 31 and a second planetary gear 32 and it provides four forward speeds and one backward speed. That is to say, the input shaft 14 is connected with a sun gear 32a of the second planetary gear 32 and the output shaft 15 is connected with a ring gear 31b of the first planetary gear 31 and a carrier 32c of the second planetary gear 32. Further, a first one way clutch 34 and a forward clutch 35 are provided in series between a connecting element 33 formed integrally with a carrier 31c of the first planetary gear 31 and a ring gear 32b of the second planetary gear 32 and a second one way clutch 36 and a low-reverse brake 37 are provided in parallel with each other between the connecting element 33 and a transmission case which is a stationary member. Further, an overrunning clutch 38 is disposed between the connecting element 33 and the ring gear 32b of the planetary gear 32, bypassing the forward clutch 35 and the one way clutch 34.

A band brake 40 is provided in a connecting element 39 constituted integrally with a sun gear 31a and a high clutch 43 is provided between a connecting element 41 formed integrally with the input shaft 14 and a connecting element 42 formed integrally with the carrier 31c. Further, a reverse clutch 44 is disposed between the connecting elements 39 and 41.

In the construction of this automatic gearing mechanism 30, when the gear is positioned at the first speed of ranges "D", "3" or "2", the forward clutch 35 is engaged. When the vehicle is in acceleration, the ring gear 32b is locked by the act of the both one way clutches 34, 35 and torque is transmitted to the output shaft 15 through the sun gear 32a and the carrier 32c. On the other hand, when the vehicle is coasting, the first one way clutch 34 becomes free. Then, since the overrunning clutch 38 is engaged, the second one way clutch 36 becomes free even when the rotation of the first one way clutch 34 is restricted, thereby the engine brake is not applied. When the gear is positioned at the first speed of a "1" range (low hold), since the ring gear 32b is always locked through the overrunning clutch 38 by the engagement of the low-reverse clutch 37, engine braking is operative.

When the gear is positioned at the second speed of ranges "D", "3" or "2", the forward clutch 35 and the band brake 40 are engaged and the sun gear 31a is locked by the band brake 40 applied. Then, the carrier 31c and the ring gear 32b are rotated through the connecting element 33, the forward clutch 35 and the first one way clutch 34. Due to the rotation of the ring gear 32b, a torque is generated according to the speed of the ring gear 32b increased more than the one at the first speed. When the vehicle is coasting, the connecting element 33 and the ring gear 32b are retained to be connected with each other by the engagement of the overrunning clutch 38 and as a result a driven torque is transmitted to the engine, whereby engine braking is operated.

When the gear is positioned at the third speed of ranges "D" or "3", the forward clutch 35 and the high clutch 43 are engaged respectively and by this engagement of the high clutch 43, the input shaft 14 is connected with the ring gear 32b through the connecting elements 41, 32, the carrier 31c, the connecting element 33, the forward clutch 35 and the first one way clutch 34. As a result, the second planetary gear 32 is integrated and the input shaft 14 is directly connected with the output shaft 15. When the vehicle is coasting, engine braking is operated in the same manner as in the second gear by restricting the rotation of the first one way clutch 34 through the engagement of the overrunning clutch 38.

When the gear is positioned at the fourth gear of the "D" range, the band brake is applied in addition to the above and the sun gear 31a is locked. Then, in the first planetary gear 31 the ring gear 31b increases its rotational speed by use of the torque inputted to the carrier 31c through the high clutch 43 and a torque generated by the rotation of the ring gear 31b is transmitted to the output shaft 15. In this case, engine braking is always applied because the driven torque is transmitted to the engine without going through the first and second one way clutches 34 and 36.

When the gear is positioned at the "R" range, the torque from the input shaft 14 is inputted to the sun gear 31a by the engagement of a reverse clutch 44. Further, since the carrier 31c is locked together with the connecting element 33 by the engagement of a low & reverse clutch 37, the ring gear 31b of the first planetary gear 31 is rotated in the reverse direction and the reverse torque is transmitted to the output shaft 15. Thus, in the automatic gearing mechanism 30 4-forward speeds and 1-reverse speed are obtained.

On the other hand, a pump cover 45 is provided in a wall section 3a connected with the transmission case 3 located at the front of the automatic gearing mechanism 30 and a gear pump 50 is installed in the wall section 3a. The gear pump 50 is driven by the engine power through a pump drive shaft 46 connected to an impeller cover 13a of the torque converter 13. The working oil discharged from the gear pump 50 is fed to a control valve body 47 accommodated in the oil pan 5. In the control valve body 47 miscellaneous hydraulic pressures are produced and miscellaneous valves are operated therein to make a hydraulic control on the lockup clutch 12, the torque converter 13, the automatic gearing mechanism 30 and the transfer clutch 23.

In the wall section 3a there is provided a bearing 25 with a large diameter near the gear pump and the bearing 25 rotatablly bears a drive pinion 16a meshing with a crown gear 19a of the front differential apparatus 19.

Figure 1:
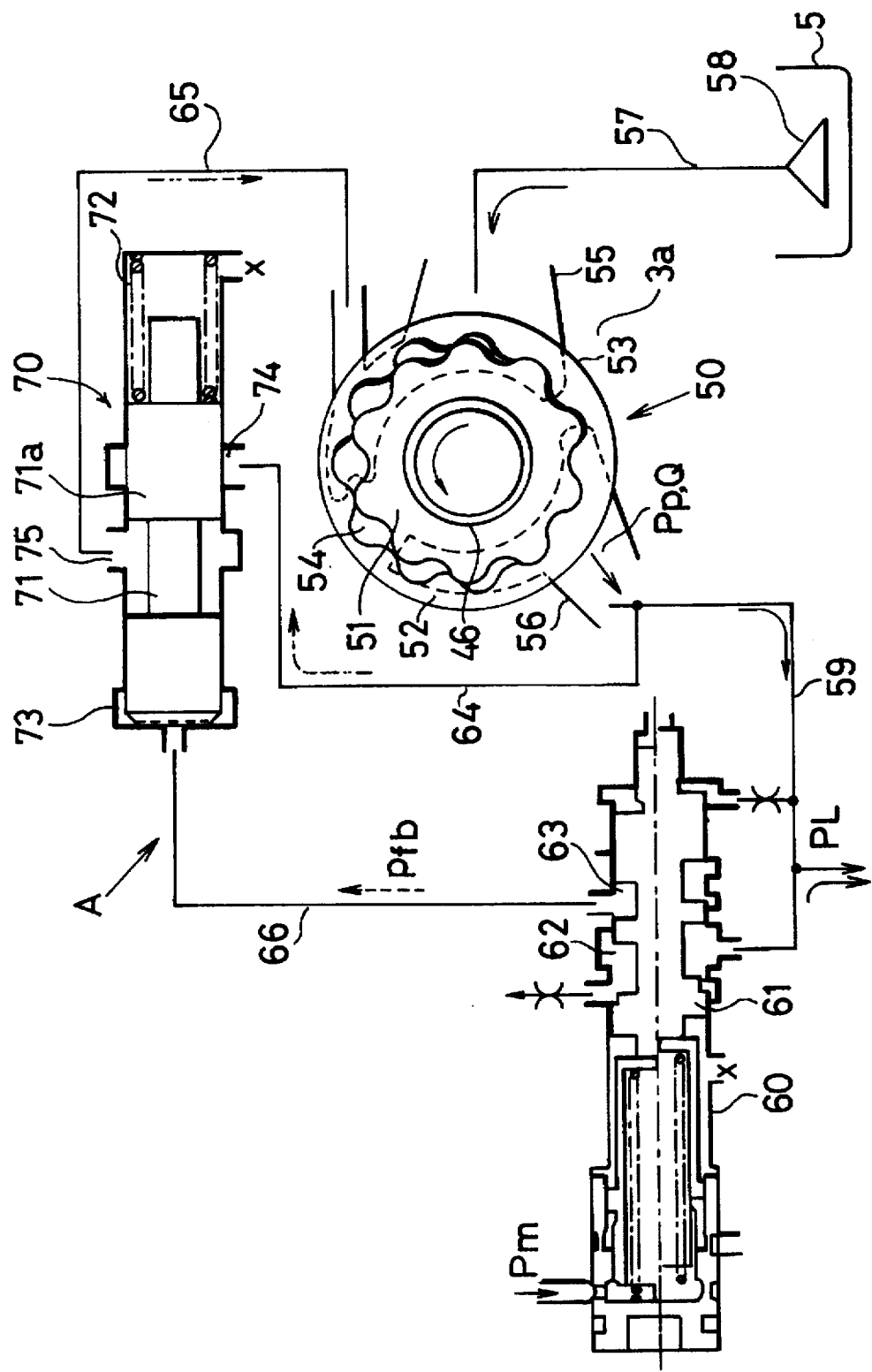
FIG. 1 is a hydraulic circuit diagram showing an embodiment of a pump discharge control apparatus for an automatic transmission according to the present invention.

Referring now to FIG. 1, an embodiment of a pump discharge control apparatus according to the present invention will be described. The pump discharge control apparatus A is constituted by the combination of the gear pump 50 of a fixed displacement type and the flow control valve. The gear pump 50 is an internal gear type of gear pump which comprises an inner rotor 51 and an outer rotor 52. Both rotors 51, 52 are accommodated in the recess 53 of the wall section 3a. The pump drive shaft 46 is connected with the inner rotor 51. A suction port 55 is provided at the displacement increasing side of the space and a discharge port 56 is provided at the displacement decreasing side thereof. The suction port 55 is communicated with the oil pan 5 through an oil passage 57 and the discharge port 56 is connected with a pressure regulating valve 60 through an oil passage 59.

The pressure regulating valve 60 is constituted such that a line pressure PL is applied to one side of a spool 61 and a spring force Fs and a modifier pressure Pm are applied to the other side of the spool 61 and thereby a specified line pressure PL is produced. Further, the pressure regulating valve 60 is operated so as to produce a high feedback pressure Pfb by increasing a communicating area between ports 62 and 63 when a pump discharge pressure Pp becomes high.

The discharge port 56 of the gear pump 50 is communicated with a flow control valve 70 through a bypass passage 64 and the flow control valve 70 is communicated with the suction port 55 of the gear pump 50 through a bypass passage 65. Here, when a face width of the gear pump 50 is set to be large in order to increase the discharge amount of the gear pump 50, a cavitation occurs because the working oil is hard to enter into the middle portion of the face width at a high speed revolution. In this embodiment, the bypass passage 65 is communicated with a portion of the displacement increasing side near the suction port 55 and therethrough the pressurized working oil is introduced to the middle portion of the face width of the space 54 to prevent the cavitation from occurring.

The flow control valve 70 is a switching type in which a spool 71 is subjected to a spring force by a spring 72 from one side thereof and subjected to a feedback pressure Pfb of a pressure chamber 73 from the other side thereof through an oil passage 66. That is, the spool 71 is moved by the difference of forces Pfb·D (D=area on which the feedback pressure Pfb is operated) and the spring force Fs so as to control the communication between a port 74 of the bypass passage 64 and a port 75 of the bypass passage 65 by opening or closing the port 74.

Next, an operation of this embodiment will be explained.

Figure 2:
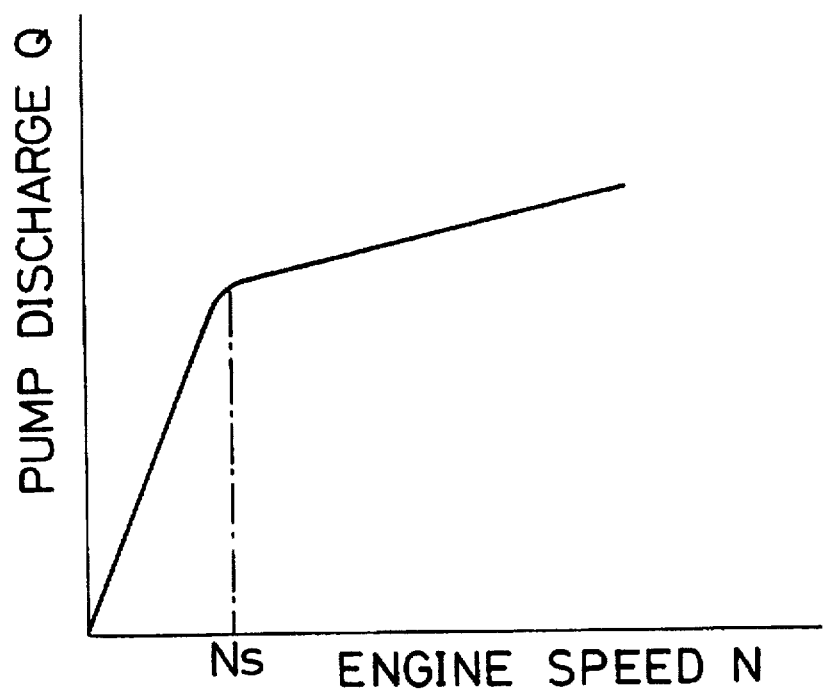
FIG. 2 is a diagram showing a discharge characteristic of a pump according to an embodiment of the present invention.

When the engine is operative, engine loading is transmitted to the inner rotor 51 of the gear pump 50 through the crank shaft 11, the cover 13a of the torque converter 13 and the pump drive shaft 46 and thus the inner rotor 51 and the outer rotor 52 are rotated while meshing with each other. The working oil of the oil pan 5 is sucked from the suction port 55 by the operation of the vacuum caused by the increasing displacement of the space 54 and the working oil of high pressure is discharged out of the discharge port 56 after being compressed by the decreasing displacement of the space 54. When the engine speed N is small, the discharge amount Q is small and the discharge pressure Pp is low and with an increase of the engine speed N the discharge amount Q (as well as the discharge pressure Pp) is increased, as shown in FIG. 2.

The working oil discharged from the discharge port 56 is introduced to the pressure regulating valve 60 and the flow control valve 70. At the pressure regulating valve 60, the specified line pressure PL and the feedback pressure Pfb are generated by regulating the discharge pressure Pp. The line pressure PL is used for the lockup control and for the automatic gearing control as mentioned before.

In a low speed and high load conditions, when a high line pressure PL is generated from the pump discharge pressure Pp with a low engine speed N, since the greater part of the discharge pressure Pp is consumed for producing the line pressure PL, the feedback pressure Pfb becomes very small. In the flow control valve 70, the spool 71 is moved toward the left side as shown in FIG. 1 by the biasing force Fs to close the port 74, whereby the return of the pump discharge is shut off.

On the other hand, in the high speed condition, when the engine speed N is increased and the pump discharge pressure Pp is high, the feedback pressure Pfb from the pressure regulating valve 60 is also high. At this moment, the force in the pressure chamber 73 by the feedback pressure Pfb becomes large and the spool 71 is moved toward the right side when that force overcomes the spring force Fs at a specified engine speed Ns and the port 74 is opened to return oil to the gear pump 50 through the bypass passage 65. Then, the discharge amount of the pump is controlled at an approximate equal level at the specified engine speed Ns and after, as indicated in FIG. 2.

At this moment, the load on the pump is reduced in accordance with the amount of the returned oil and consequently the fuel consumption of the engine can be improved. Further, since the returned oil is introduced with a positive pressure to the middle portion of the face, the cavitation is prevented and the pump noise can be reduced.

Figure 3:
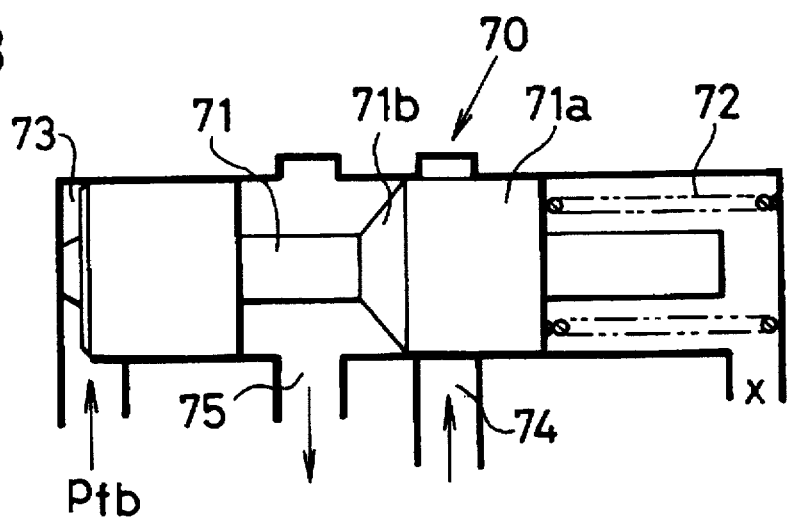
FIG. 3 is a cross sectional view showing a variation of a flow control valve according to the present invention.
Figure 4:
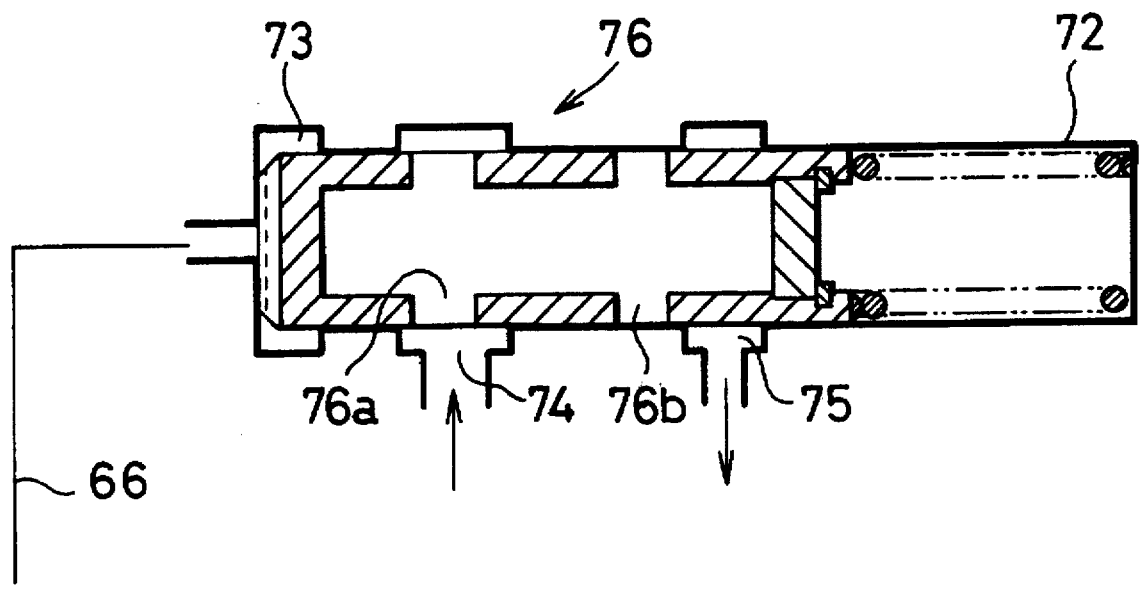
FIG. 4 a cross sectional view showing another variation of a flow control valve according to the present invention.

FIG. 3 and FIG. 4 show an example of variations of the flow control valve 70 respectively. An example of the flow control valve shown in FIG. 3 is characterized in a tapered section 71b provided on the land 71a of the spool 71. Other constructions than this tapered section are the same as the flow control valve shown in FIG. 1. In the flow control valve 70 illustrated in FIG. 3, when the land 74a of the spool 71 is moved to open or close the port 74, the discharge pressure Pp and the discharge amount Q are gradually changed due to the tapered configuration 71b, that is to say, the discharge characteristic of the pump can be smoothly switched.

Further, the flow control valve 70 shown in FIG. 4 has a hollow cylinder shaped spool 76 whose both ends are closed. In the spool 76, there are provided a port 76a which is always open to the port 74 at the bypass passage 64 side and a port 76b which is opened or closed to the port 75 at the bypass passage 65 according to the movement of the spool 76. Further, according to the opening area of the port 76b the working oil flows back to the pump through the bypass passage 65.

Figure 5A:
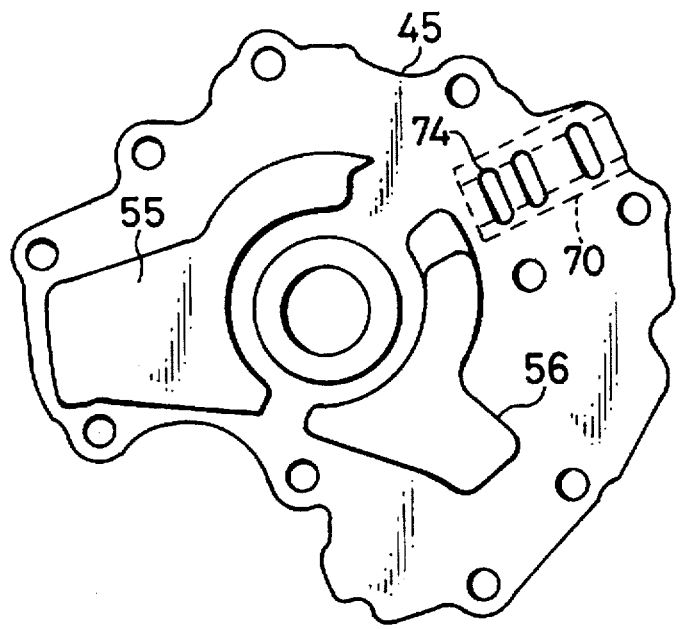
FIG. 5A is a plan view of a pump cover.
Figure 5B:
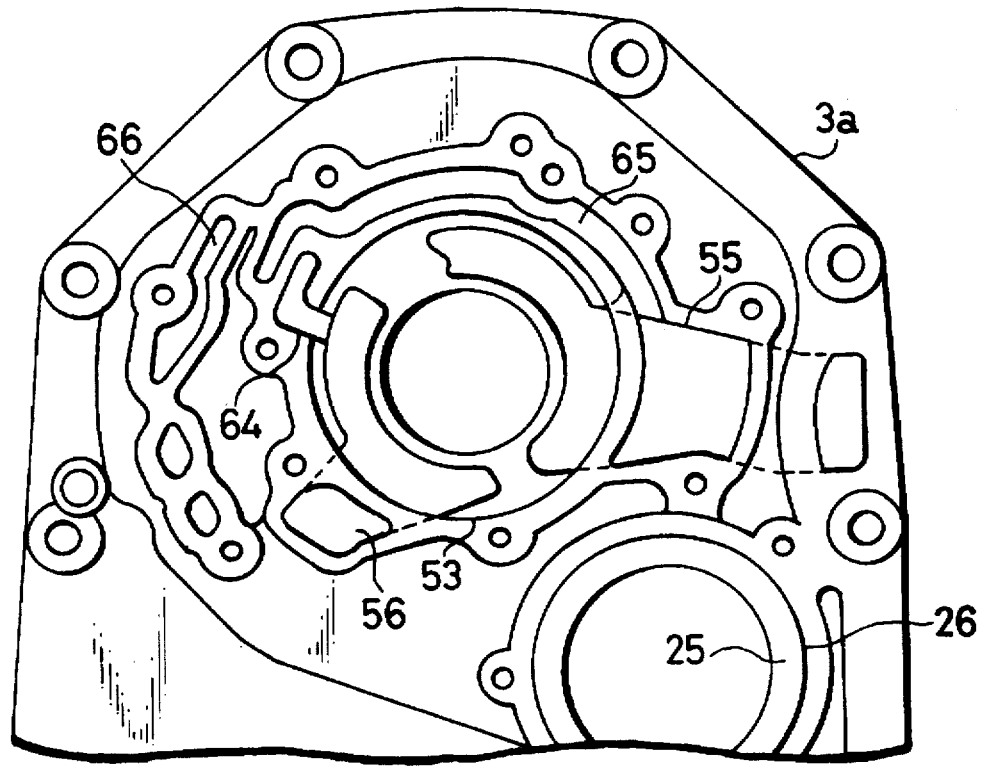
FIG. 5B is a plan view of a wall section.

Referring to FIG. 5A and 5B, it will be described how the gear pump 50 and the flow control valve 70 are installed in the automatic transmission.

In this embodiment a cylinder like recess 53 having a bottom is formed in the wall section 3a separating the torque converter 12 from the automatic gearing mechanism 30. The suction port 55 and the discharge port 56 are formed on the both wall section 3a and the pump cover 45. The flow control valve 70 is disposed near the compression starting side of the discharge port 56 in the radial direction with the port 74 opened. Further, in the wall section 3a the bypass passage 64 for communicating the discharge port 56 with the flow control valve 70 and the bypass pasage 65 for communicating the flow control valve 70 and the suction port 55 are formed with a shortest distance from each other and at the far outer portion of the wall section 3a there is provided the oil passage 66 for transmitting the feedback pressure Pfb.

The rotors 51 and 52 are accommodated in the recess 53 of the wall section 3a, then the pump cover 45 is put on the wall section 3a, then they are fastened with bolts. Further, a bearing 25 for supporting the drive pinion 16a is fitted in the hole 26 which is provided below the ports 55 and 56 and between them in the wall section 3a. Since the thrust force exerted on the bearing 25 from the drive pinion 16a is supported by the whole body of the wall section 3a, there is no effect of the thrust force on the gear pump 50 and the flow control valve 70.

The hydraulic pump for the automatic transmission described in this embodiment is a gear pump but it is not limited thereto. Any other types of pump, for example, a vane pump, a trochoid pump, a roller vane pump and the like may be used if they belong to a fixed displacement type of pump.

In summary, since the discharge control apparatus of the hydraulic pump for the automatic transmission according to the present invention is constituted by a bypass passage provided between the discharge port and the suction port, a flow control valve provided in the bypass passage and a pressure regulating valve for controlling the flow control valve by way of the feedback pressure thereof, the amount of discharge can be controlled property and further the fuel consumption of the engine can be improved. Further, since this discharge control apparatus is constructed by the combination of the fixed displacement type pump and the flow control valve, the construction is very simple and therefore the manufacturing cost is low. Furthermore, since the construction of the apparatus is simple and compact, there is an advantage in an installability of the apparatus and a space utility in the transmission case.

Further, since the discharge control apparatus according to the present invention is constituted such that the pressurized working oil is returned to a portion near the suction port of the pump, cavitations or pump noises caused thereby can be prevented.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A control system of a hydraulic pump for an automatic transmission having an engine connected to said automatic transmission for transmitting power and for directly driving said hydraulic pump, a transmission case entirely enclosing said automatic transmission, a pump cover connected to said transmission case for covering said hydraulic pump, a wall section provided in front of said hydraulic pump for covering thereof, and a pressure regulating valve operatively connected to a delivery port of said hydraulic pump for controlling a line pressure of said control system, comprising:

a flow control valve included in said pump cover and operatively connected between said hydraulic pump and said pressure regulating valve for controlling a supply of hydraulic oil to said control system;

an oil passage formed in said wall section for communicating between an oil chamber of said flow control valve and a feedback pressure port of said pressure regulating valve for urging an end of said flow control valve to be displaced by a feedback pressure; and a bypass passage formed in said wall section for communicating between said delivery port and a first port of said flow control valve; wherein said flow control valve accurately regulates a delivery pressure in accordance with said feedback pressure so as to effectively economize fuel consumption in a rigid compact configuration.

2. The control system according to claim 1, wherein:

said bypass passage is connected to a vicinity of a suction port of said hydraulic pump.

3. The control system according to claim 1, wherein:

said flow control valve is installed near said delivery port of said hydraulic pump; and said bypass passage is engraved in said wall section so as to surround said hydraulic pump.

4. The control system according to claim 1, wherein said pump is a gear pump.

* * * * *